US006977688B2

(12) United States Patent
Hanada et al.

(10) Patent No.: US 6,977,688 B2
(45) Date of Patent: Dec. 20, 2005

(54) AUXILIARY POWER SUPPLY UNIT AND PORTABLE ELECTRONIC SYSTEM

(75) Inventors: Yuji Hanada, Saitama (JP); Shinichi Kakiuchi, Saitama (JP)

(73) Assignee: PENTAX Corporation, Tokyo (JP)

(*) Notice: Subject to any disclaimer, the term of this patent is extended or adjusted under 35 U.S.C. 154(b) by 770 days.

(21) Appl. No.: 10/020,294

(22) Filed: Dec. 18, 2001

(65) Prior Publication Data

US 2002/0075397 A1 Jun. 20, 2002

(30) Foreign Application Priority Data

Dec. 19, 2000 (JP) ............................ 2000-385185

(51) Int. Cl.[7] .............................................. H04N 5/225
(52) U.S. Cl. ...................................... 348/372; 348/375
(58) Field of Search ............................... 348/372, 373, 348/375, 376

(56) References Cited

U.S. PATENT DOCUMENTS

| | | | | |
|---|---|---|---|---|
| 5,455,625 | A * | 10/1995 | Englander | 348/375 |
| 5,568,198 | A * | 10/1996 | Sakurai et al. | 348/372 |
| 5,784,105 | A * | 7/1998 | Kawamura | 348/372 |
| 6,075,566 | A * | 6/2000 | Suemoto et al. | 348/372 |
| 6,101,339 | A * | 8/2000 | Miki et al. | 396/301 |
| 6,424,156 | B1 * | 7/2002 | Okamura | 324/426 |
| 6,477,588 | B1 * | 11/2002 | Yerazunis et al. | 710/13 |
| 6,580,460 | B1 * | 6/2003 | Takahashi et al. | 348/372 |
| 6,587,152 | B1 * | 7/2003 | Sharp et al. | 348/373 |
| 6,795,110 | B1 * | 9/2004 | Kossin | 348/81 |
| 6,812,971 | B2 * | 11/2004 | Terane | 348/375 |
| 2001/0028571 | A1 * | 10/2001 | Hanada et al. | 363/50 |
| 2001/0038275 | A1 * | 11/2001 | Hanada | 320/118 |
| 2002/0149695 | A1 * | 10/2002 | Kayanuma | 348/375 |
| 2003/0011702 | A1 * | 1/2003 | Ohmura et al. | 348/372 |

* cited by examiner

*Primary Examiner*—Wendy R. Garber
*Assistant Examiner*—Jacqueline Wilson
(74) *Attorney, Agent, or Firm*—Greenblum & Bernstein, P.L.C.

(57) ABSTRACT

An auxiliary power supply unit which is mountable to a portable electronic device having a battery, includes at least one capacitor, and an I/F connector which is connectable to an I/F connector of the portable electronic device, the I/F connector of the portable electronic device including power terminals connected to the battery. The I/F connector of the auxiliary power supply unit includes power terminals connected to the at least one capacitor, wherein the at least one capacitor is connected in parallel to the battery when the auxiliary power supply unit is mounted to the portable electronic device via the power terminals of the I/F connectors.

15 Claims, 7 Drawing Sheets

AUXILIARY POWER SUPPLY UNIT AND PORTABLE ELECTRONIC SYSTEM

BACKGROUND OF THE INVENTION

1. Field of the Invention

The present invention relates to an auxiliary power supply unit for a portable electronic device, and also relates to a portable electronic system which is composed of a portable electronic device, such as a digital camera, and one or more associated accessories.

2. Description of the Related Art

Various types of batteries are available on the market; each type generally has a factory-recommended final voltage which guarantees the safety of the battery. If battery continues to be used after the battery voltage drops below the final voltage, the battery may produce heat, which in turn may leak liquid, or worse explode, under some conditions. If battery leaks or explodes, a device in which the battery is loaded may malfunction or may be damaged.

To prevent such problems from occurring, in conventional portable electronic devices which use a battery as a power supply, the battery voltage is regularly checked to ensure the safety of the battery. For example, if the battery voltage reaches the final voltage thereof, the user can be warned that the battery is nearly exhausted, and the user is either prompted to replace the battery or the operation of the portable electronic device is stopped to prohibit the user from further using the nearly-exhausted battery.

However, the internal resistance of the battery varies in accordance with the servicing environment of the battery and the operating condition of the portable electronic device. When the portable electronic device operates at a low temperature or when the portable electronic device is performing an operation requiring a large current sporadically, the internal resistance of the battery appears to increase, which may cause a power-supply-voltage detecting circuit provided in the device to mistakenly determine that the battery voltage has reached the final voltage. In this case, the user is erroneously informed that the battery is nearly exhausted, and therefore he or she replaces the battery with a new one. Consequently, the energy of the battery is not used up sufficiently.

To prevent this problem from occurring, a battery which excels in temperature characteristics can be used, a high precision power-supply-voltage detecting circuit can be provided in the portable electronic device, or the portable electronic device can be provided therein with an additional circuit which can reduce the internal resistance of the battery. However, all of these proposals cause the portable electronic device to be increased in size, thereby increasing weight and increasing the cost of production, which are undesirable. In addition, such proposals can be wasteful since, in some cases, the final voltage is hardly ever mistakenly detected under some conditions.

SUMMARY OF THE INVENTION

An object of the present invention is to provide an auxiliary power supply unit and a portable electronic system which can restrain power supply voltage fluctuation of a portable electronic device and which can improve the consuming efficiency of a battery loaded in the portable electronic device.

To achieve the object mentioned above, according to an aspect of the present invention, an auxiliary power supply unit is provided, which is mountable to a portable electronic device having a battery, including at least one capacitor, and an I/F connector which is connectable to an I/F connector of the portable electronic device, the I/F connector of the portable electronic device including power terminals connected to the battery. The I/F connector of the auxiliary power supply unit includes power terminals connected to the at least one capacitor, wherein the at least one capacitor is connected in parallel to the battery when the auxiliary power supply unit is mounted to the portable electronic device via the power terminals of the I/F connectors.

Preferably, the at least one capacitor is connected in parallel to the battery so as to reduce an internal resistance of the battery when the auxiliary power supply unit is mounted to the portable electronic device via the power terminals the I/F connectors.

Preferably, the at least one capacitor includes at least one large-capacity capacitor, wherein, in a state where the at least one capacitor is connected in parallel to the battery, the at least one capacitor discharges to supply power to the portable electronic device when the portable electronic device is in operation, while the battery supplies power to the at least one capacitor to charge the at least one capacitor.

The portable electronic device can be a digital camera.

Preferably, the auxiliary power supply unit can be attached to the portable electronic device at a position so as not to hinder operability of the portable electronic device.

Preferably, the auxiliary power supply unit can be attached to the bottom surface of the portable electronic device.

According to another aspect of the present invention, a portable electronic system is provided, including a portable electronic device including a battery and a first I/F connector having terminals connected to a battery, and at least one accessory which is mountable to the portable electronic device and includes a second I/F connector, the at least one accessory being mounted to the portable electronic device via the first and second I/F connectors. One of the at least one accessory includes an auxiliary power supply unit having at least one capacitor, the second I/F connector of the auxiliary power supply unit including terminals connected to the at least one capacitor, and the at least one capacitor is connected in parallel to the battery when the auxiliary power supply unit is mounted to the portable electronic device via the first I/F connector and the second I/F connector.

Preferably, the at least one capacitor is connected in parallel to the battery so as to reduce an internal resistance of the battery when the auxiliary power supply unit is mounted to the portable electronic device via the first and second I/F connectors.

With this structure, power supply voltage fluctuation of the portable electronic device is kept low by the auxiliary power supply unit. Therefore, an error in the detection of the final voltage of the battery is prevented from occurring, and the energy of the battery can be used up sufficiently.

Preferably, the second I/F connector of the auxiliary power supply unit and the second I/F connector of another the at least one accessory are constructed substantially the same so as to both correspond to the first I/F connector.

Preferably, the first I/F connector includes control terminals used for communication between the portable electronic device and the at least one accessory.

The portable electronic device can be a digital camera.

According to another aspect of the present invention, a digital camera system is provided, including a camera body including a battery and a first I/F connector having power terminals connected to the battery, and at least one accessory which is mountable to the camera body and includes a second I/F connector, the at least one accessory being mounted to the camera body via the first and second I/F connectors. One of the at least one accessory includes an auxiliary power supply unit having at least one capacitor, the second I/F connector of the auxiliary power supply unit including power terminals connected to the at least one capacitor. The at least one capacitor is connected in parallel to the battery when the auxiliary power supply unit is mounted to the digital camera via the first and second I/F connectors.

Preferably, one of the at least one accessory includes a printer unit.

With this structure, the I/F connector of the portable electronic device can serve a multi-purpose connector not only for the auxiliary power supply unit but also for any other accessories for the portable electronic system. Therefore, it is no longer necessary for the portable electronic device to be provided with an additional connector designed specifically for the auxiliary power supply unit, which reduces the cost of production.

The present disclosure relates to subject matter contained in Japanese Patent Application No.2000-385185 (filed on Dec. 19, 2000) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
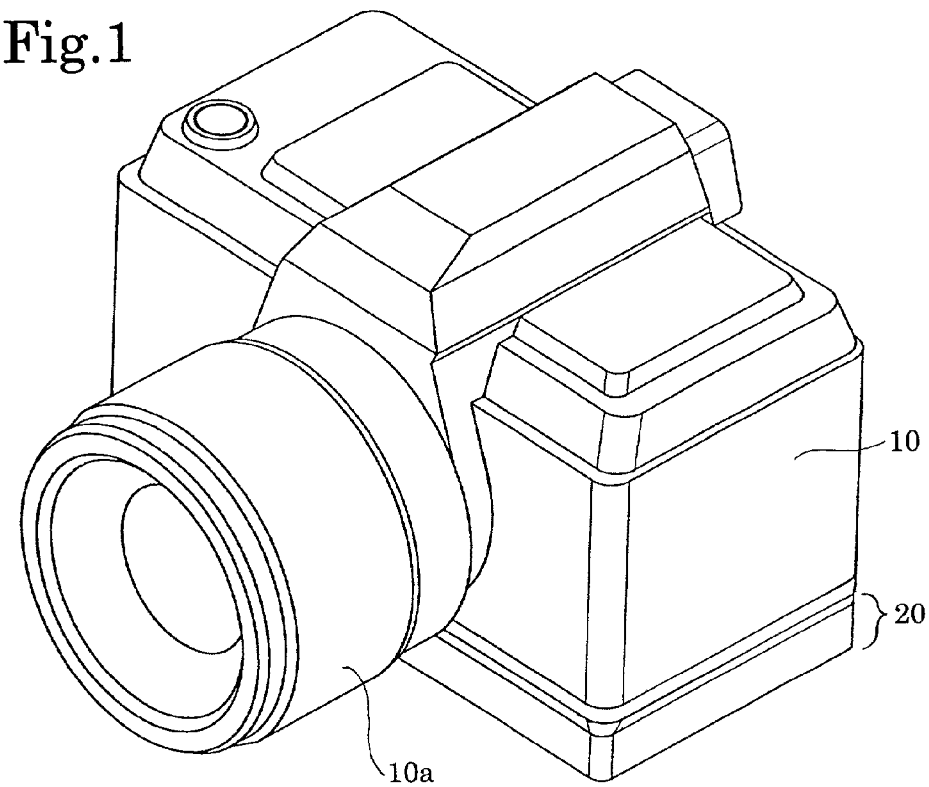
FIG. 1 is a perspective view of an embodiment of a digital camera system to which the present invention is applied in a state where an auxiliary power supply unit is mounted to a camera body of the digital camera system.
Figure 2:
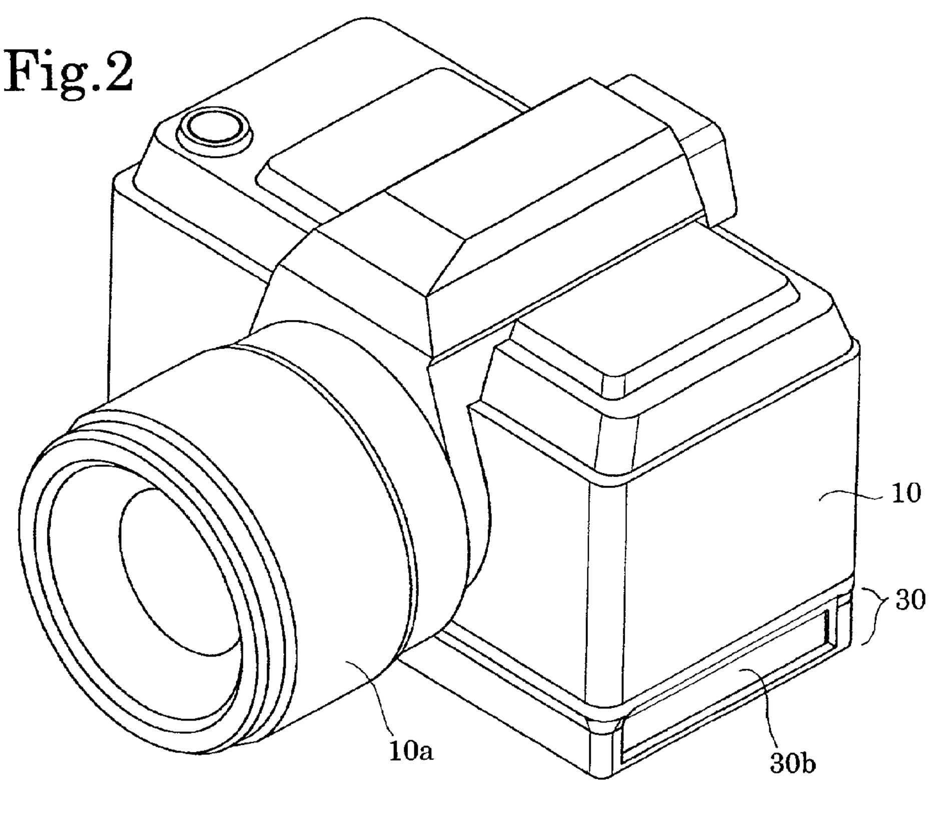
FIG. 2 is a perspective view of the embodiment of the digital camera system shown in FIG. 1 in a state where a printer unit is mounted to the camera body.

The overall structure of a digital camera system (portable electronic system) to which the present invention is applied will be hereinafter discussed with reference to FIGS. 1 through 4. The digital camera system is composed of a camera body (portable electronic device/digital camera) 10 to which a photographing lens 10*a* is fixed, and camera accessories which are mounted to the camera body 10 when in use. The camera accessories include an auxiliary power supply unit 20 shown in FIG. 4 and a printer unit 30 shown in FIG. 5. FIG. 1 shows a state of the digital camera system in which the auxiliary power supply unit 20 is mounted to the bottom of the camera body 10, while FIG. 2 shows another state of the digital camera system in which the printer unit 30 is mounted to the bottom of the camera body 10.

Figure 3:
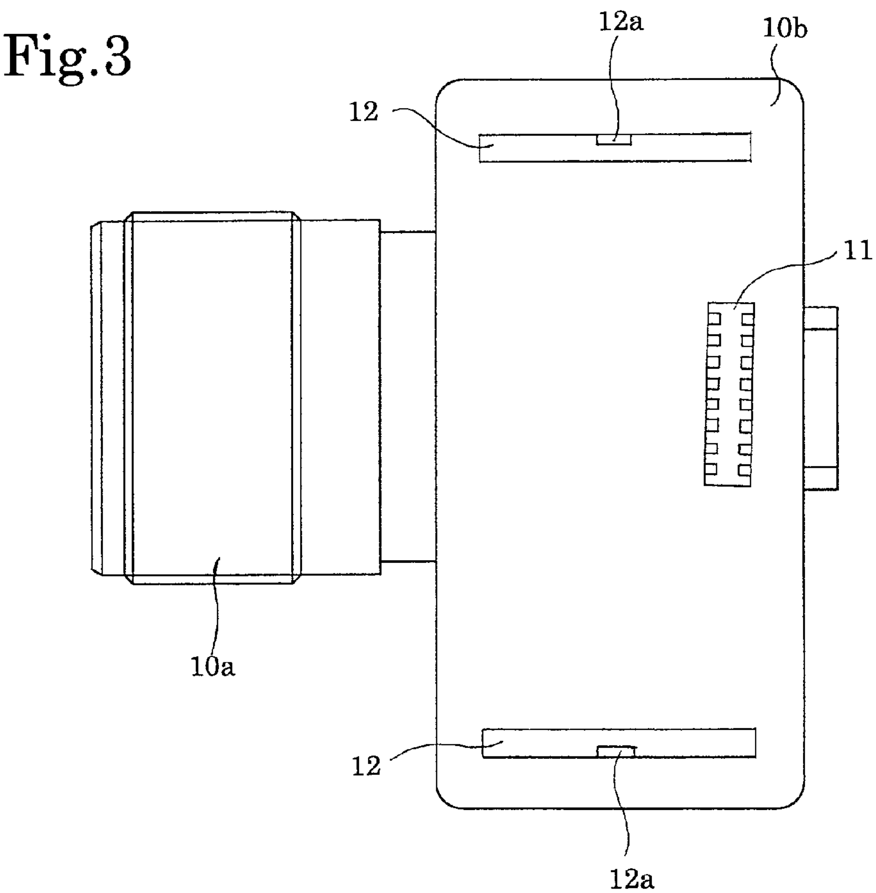
FIG. 3 is a bottom plan view of the camera body of the digital camera system shown in FIG. 1.

The camera body 10 is provided on a bottom surface 10*b* thereof with an I/F socket (I/F connector) 11 and a pair of locking/locating slots 12 (see FIG. 3). The pair of locking/locating slots 12 are used for mounting the auxiliary power supply unit 20 or the printer unit 30 to the bottom of the camera body 10 while positioning the auxiliary power supply unit 20 or the printer unit 30 accurately relative to the bottom surface 10*b* of the camera body 10. The camera body 10 is provided in each of the pair of locking/locating slots 12 with an engaging claw 12*a*. Each engaging claw 12*a* is normally biased in a direction toward the inside of the corresponding slot 12 (i.e., in a locking direction) by a spring member (not shown), and can be retracted in a direction opposite to the locking direction (i.e., in an unlocking direction) by an operation of an unlock member (not shown).

Figure 4:
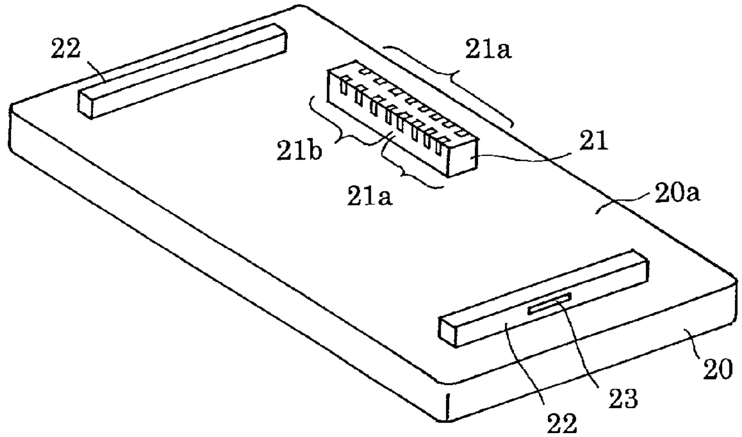
FIG. 4 is a perspective view of the auxiliary power supply unit shown in FIG. 1, showing the top face thereof.

As shown in FIG. 4, the auxiliary power supply unit 20 is in the shape of a flat box, and has a substantially rectangular upper surface 20*a* which corresponds to the bottom surface 10*b* of the camera body 10. The auxiliary power supply unit 20 serves as a part of a power circuit of the camera body 10 when mounted to the camera body 10. The auxiliary power supply unit 20 is provided on the upper surface 20*a* thereof with an I/F plug (I/F connector) 21 which is fitted into the I/F socket 11 of the camera body 10, and a pair of locking/locating projections 22 which are respectively fitted into the pair of locking/locating slots 12 of the camera body 10. The I/F plug 21 is provided with a control terminal array 21*a* and a power terminal array 21*b*. Each of the pair of locking/locating projections 22 is provided with an engaging recess 23 in which the corresponding engaging claw 12*a* is engaged when the pair of locking/locating projections 22 are respectively fitted into the pair of locking/locating slots 12. Fitting the pair of locking/locating projections 22 into the pair of locking/locating slots 12 causes the I/F plug 21 to be fitted into the I/F socket 11, respectively, and at the same time causes the pair of engaging claws 12*a* to be engaged in the pair of engaging recesses 23, respectively, to thereby lock the auxiliary power supply unit 20 to the camera body 10. In a state where the auxiliary power supply unit 20 is locked to the camera body 10, if it is required that the auxiliary power supply unit 20 be dismounted from the camera body 10, the aforementioned unlock member is operated so that the pair of engaging claws 12*a* are respectively disengaged from the pair of engaging recesses 23, and subsequently the auxiliary power supply unit 20 is removed from the camera body 10 with the pair of engaging claws 12*a* being disengaged from the pair of engaging recesses 23.

Figure 5:
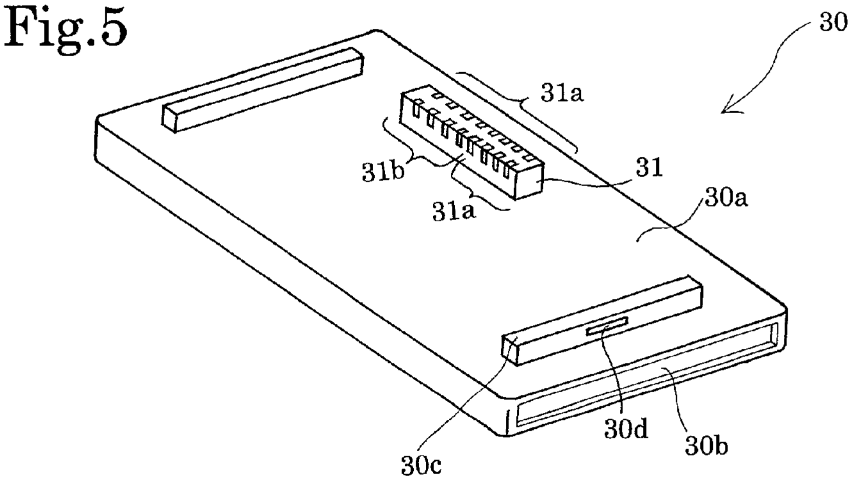
FIG. 5 is a perspective view of the printer unit shown in FIG. 2, showing the top face thereof.

Similar to the auxiliary power supply unit 20, the printer unit 30 is in the shape of a flat box, and has a substantially rectangular upper surface 30*a* which corresponds to the bottom surface 10*b* of the camera body 10. The printer unit 30 serves as a printer for producing prints of digital images when mounted to the camera body 10. The printer unit 30 is provided on one end face thereof with an ejection slot 30*b* (see FIGS. 1 and 5) from which prints are ejected. As shown in FIG. 5, the printer unit 30 is provided on the upper surface 30*a* thereof with an I/F plug (I/F connector) 31 which is fitted into the I/F socket 11 of the camera body 10, and a pair of locking/locating projections 30*c* which are respectively fitted into the pair of locking/locating slots 12 of the camera body 10. Each of the pair of locking/locating projections 30*c* is provided with an engaging recess 30*d* in which the corresponding engaging claw 12*a* is engaged when the pair of locking/locating projections 30*c* are respectively fitted into the pair of locking/locating slots 12. The I/F plug 31 is provided with a control terminal array 31*a* and a power terminal array 31*b*.

In the present embodiment, the I/F plug 21 of the auxiliary power supply unit 20 and the I/F plug 31 of the printer unit 30 are made under the same standard. In other words, the I/F socket 11 of the camera body 10 is made to serve as a multi-purpose socket 11 for various accessories for the digital camera system. Furthermore, ease of operability of the camera is not sacrificed (i.e., not hindered) when the auxiliary power supply unit 20 or the printer unit 30 is attached to the bottom surface 10*b* of the camera body 10.

Figure 6:
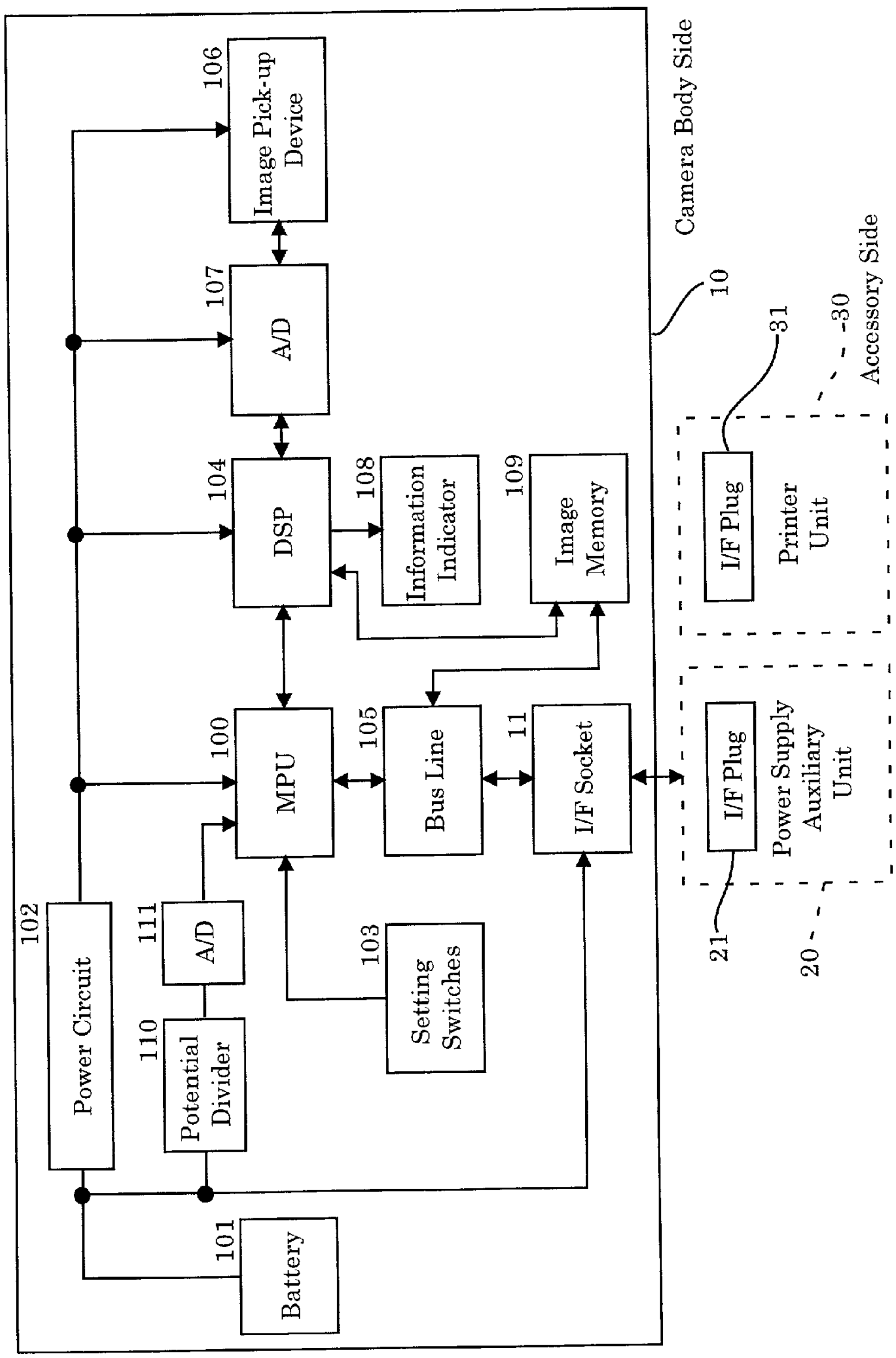
FIG. 6 is a block diagram of a control system of the digital camera system shown in FIG. 1.
Figure 7:
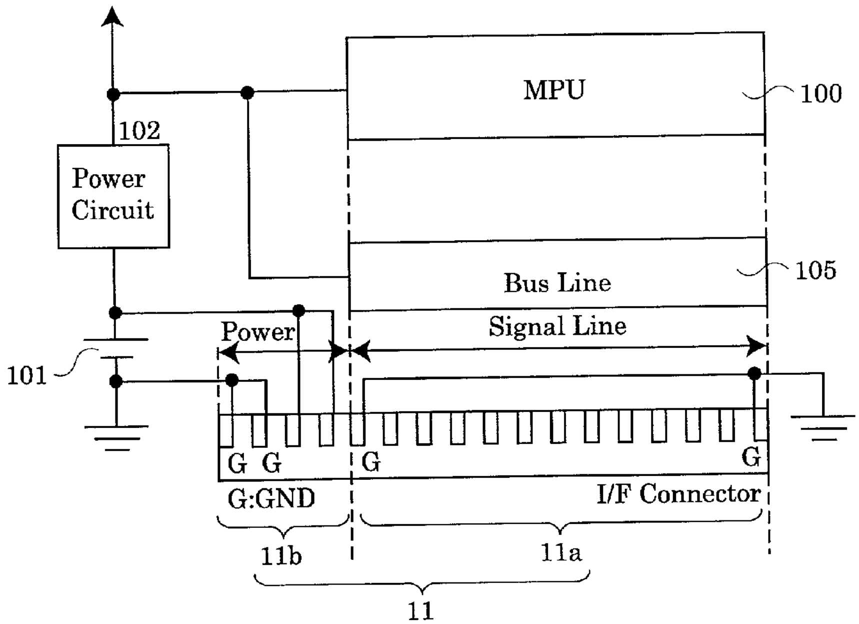
FIG. 7 is an explanatory view of an I/F socket of the camera body shown in FIG. 3.

The control system of the present embodiment of the digital camera system will be hereinafter discussed in detail with reference to FIGS. 6 through 8. FIG. 6 is a block diagram of a control system of the present embodiment of the digital camera system. The digital camera system is provided with an MPU 100 serving as a controller which comprehensively controls the overall operation of the digital camera system. The MPU 100 is provided therein with a ROM (not shown) in which various control programs are stored, and a RAM (not shown) in which various data are temporarily stored. The digital camera system is further provided with a power circuit 102, setting switches 103, a DSP (digital signal processor) 104, a bus line 105, an image pick-up device (e.g., a CCD image sensor) 106, a first A/D converter 107, an information indicator 108, an image memory 109, a potential divider 110, and a second A/D converter 111.

A constant voltage is supplied to the MPU 100 from the battery 101 via the power circuit 102. The MPU 100 operates with the power supplied via the power circuit 102, and performs various processes corresponding to a state of setting switches 103. Each of the setting switches 103 is operated upon operation thereof by the user. The MPU 100 monitors the battery voltage via the potential divider 110 and the second A/D converter 111 to warn the user that the battery 101 is nearly exhausted before the battery voltage reaches a predetermined final voltage of the battery 101.

The first A/D converter 107, the information indicator 108 and the image memory 109 are connected to the DSP 104. The first A/D converter 107 converts analog image signals output from the image pick-up device 106 into a digital image signal. The information indicator 108 visually indicates digital images taken by the image pick-up device 106, and various photographic information. The information indicator 108 is, e.g., a color LCD panel provided at the back of the camera body 10. The image memory 109 stores digital image signals output from the first A/D converter 107. The image memory 109 is, i.e., a cache memory incorporated in the camera body 10 or a removable nonvolatile memory card such as CompactFlash or SmartMedia. The MPU 100 controls the indicating process performed via the DSP 104, and the MPU 100 also controls the image pick-up process, which is performed by the image pick-up device 106, via the DSP 104 and the first A/D converter 107.

The MPU 100 controls operations of an accessory (e.g., the auxiliary power supply unit 20 or the printer unit 30) connected to the I/F socket 11 via the bus line 105. As shown in FIG. 7, the I/F socket 11 is provided with a control terminal array 11*a* and a power terminal array 11*b*, which are brought into contact with the control terminal array 21*a* or 31*a* and the power terminal array 21*b* or 31*b* when the I/F plug 21 or 31 of the mounted accessory (e.g., auxiliary power supply unit 20 or printer unit 30) is fitted into the I/F socket 11, respectively. The control terminal array 11*a* is connected to the bus line 105 so that control signals are transmitted between the camera body 10 and the mounted accessory (e.g., auxiliary power supply unit 20 or printer unit 30) via the control terminal array 11*a* and the corresponding control terminal array 21*a* or 31*a*. The power terminal array 11*b* is connected between the terminals of the power circuit 102 so that the camera body 10 gives power to (or gives and receives power to and from) the mounted accessory (e.g., auxiliary power supply unit 20 or printer unit 30) via the power terminal array 11*b* and the corresponding power terminal array 21*b* or 31*b*.

The MPU 100 identifies the type of accessory mounted immediately after an accessory is mounted to the camera body 10 via the I/F socket 11. Namely, immediately after an accessory is mounted to the camera body 10 via the I/F socket 11, the MPU 100 outputs an accessory-type identifying signal to the mounted accessory and receives an ID signal from the mounted accessory. The ID signal is predetermined for each associated accessory, so that the MPU 100 identifies the type of the accessory mounted to the camera body 10 in accordance with the received ID signal.

Figure 8B:
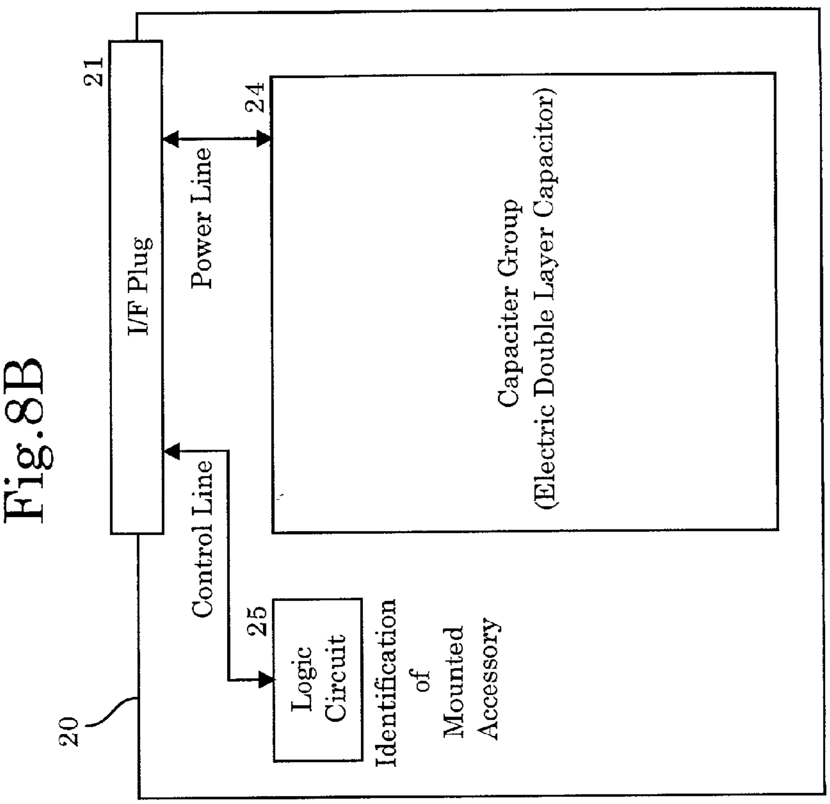
FIG. 8B is a block diagram of fundamental elements of the auxiliary power supply unit shown in FIGS. 1 and 4.
Figure 8A:
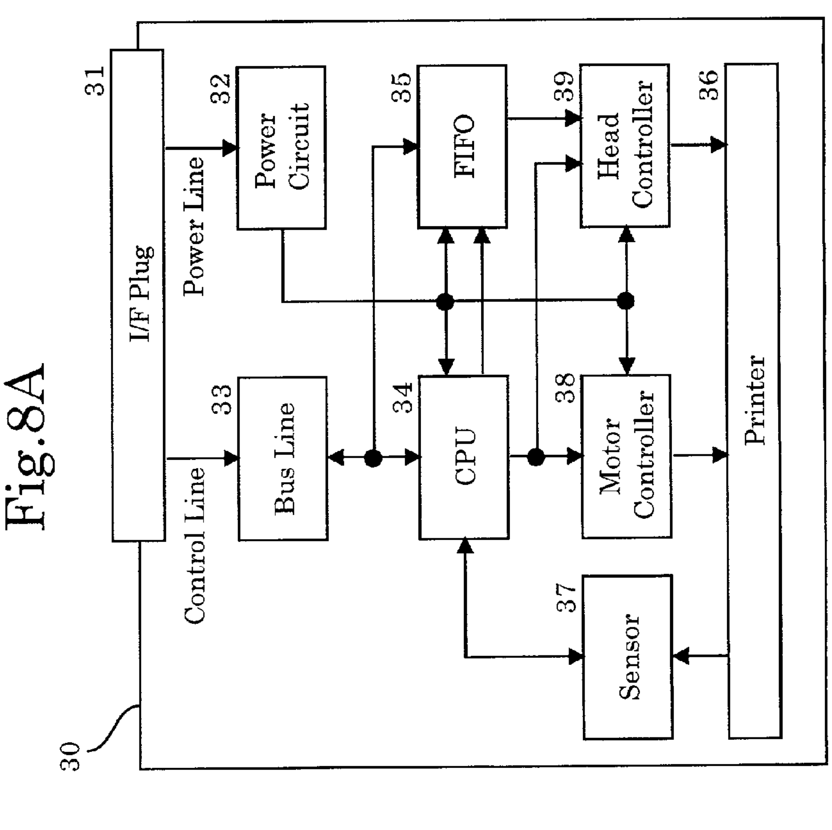
FIG. 8A is a block diagram of fundamental elements of the printer unit shown in FIGS. 2 and 5.

As shown in FIG. 8A, the printer unit 30 is provided with a power circuit 30*c*, a bus line 33, a CPU 34, a FIFO (first-in first-out) circuit 35, a printer 36, a sensor 37, a motor controller 38 and a head controller 39. If the printer unit 30 is mounted to the camera body 10 via the I/F socket 11 and the I/F plug 31, the bus line 105 of the camera body 10 is connected to the bus line 33 of the printer unit 30 via the control terminal arrays 11*a* and 31*a*, and the battery 101 of the camera body 10 is connected to the power circuit 32 of the printer unit 30 via the power terminal arrays 11*b* and 31*b* (see FIG. 8A). The power circuit 32 regulates the D.C. voltage output from the battery 101 to supply the battery voltage to each circuit of the printer unit 30 as a constant voltage. The CPU 34 and the FIFO circuit 35 are connected to the bus line 33.

The CPU 34 is provided therein with a ROM (not shown) in which various control programs are stored, and a RAM (not shown) in which various data are temporarily stored. The aforementioned ID signal, which is unique to the printer unit 30, is stored in the ROM. The CPU 34 communicates with the MPU 100 of the camera body 10 via the bus line 33. Upon inputting a printing request from the MPU 100 of the camera body 10, the CPU 34 inputs image data for printing via the bus line 33 to store the input image data in the FIFO circuit 35. The FIFO circuit 35 serves as a buffer memory. Immediately after a predetermined volume of image data is stored in the FIFO circuit 35, the CPU 34 reads out image data from the FIFO circuit 35 in the same order that the FIFO circuit 35 was input, to print images on paper (not shown) through the printer 36. This printing process of the printer 36 is controlled by the CPU 34. The CPU 34 operates the motor controller 38 and the head controller 39 while detecting the position of a printing head (not shown) to perform the printing operation. The basic structure of the printer unit 30 is that of a typical printer unit known in the art, and therefore a further description about operations of the printer unit 30 are omitted.

As shown in FIG. 8B, the auxiliary power supply unit 20 is provided with a capacitor group 24 and a logic circuit 25 which are connected to the I/F plug 21. If the auxiliary power supply unit 20 is connected to the camera body 10 via the I/F socket 11 and the I/F plug 21, the logic circuit 25 is connected to the MPU 100 via the bus line 105 of the camera body 10, and the control terminal arrays 11*a* and 21*a*, while the capacitor group 24 is connected in parallel to the battery 101 of the camera body 10 via the power terminal arrays 11*b* and 21*b* (see FIG. 8B). The capacitor group 24 consists of a plurality of capacitors, preferably large-capacity electric double layer capacitors. The logic circuit 25 outputs the aforementioned ID signal, which is unique to the auxiliary power supply unit 20, to the MPU 100 of the camera body 10.

Figure 9:
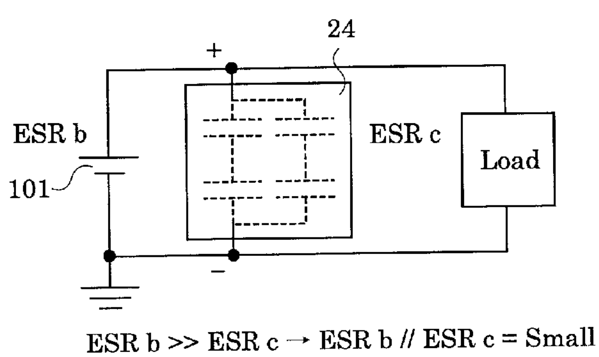
FIG. 9 is a schematic connection diagram of the battery provided in the camera body, a capacitor group provided in the auxiliary power supply unit, and the load on the battery and the capacitor group.

FIG. 9 is a schematic connection diagram of the battery 101, the capacitor group 24, and a load on the battery 101 and the capacitor group 24. In the illustrated embodiment shown in FIG. 9, the capacitor group 24 consists of two pairs of electric double layer capacitors. Two capacitors of each pair are connected in series, while the two pairs are connected in parallel.

Figure 10:
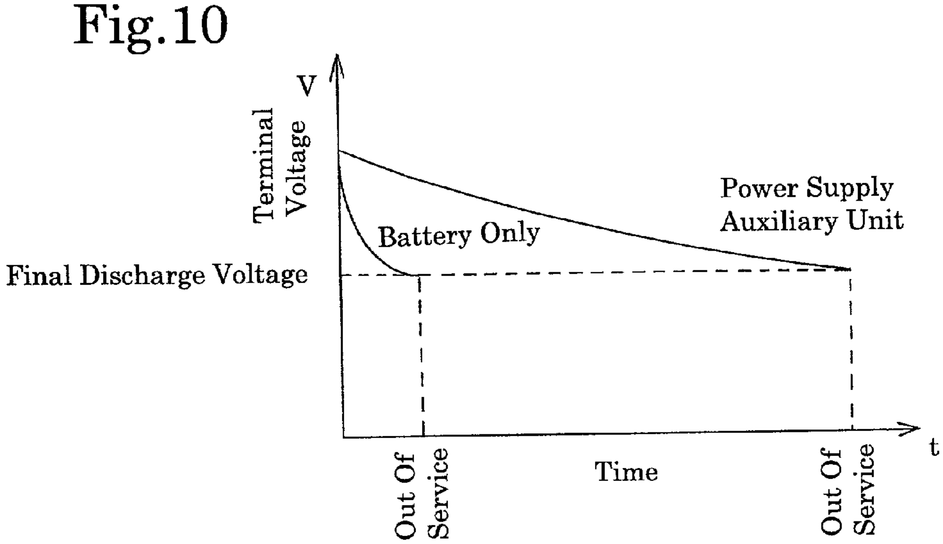
FIG. 10 is a graph showing a discharge characteristic when only a battery is used, and another discharge characteristic when both the battery and the auxiliary power supply unit are used.

In a state where the capacitor group 24 is connected in parallel to the battery 101, the battery 101 supplies power to charge the capacitor group 24. At the same time the capacitor group 24 discharges to supply power to the camera body 10 when the camera body 10 is in operation. The discharge of the capacitor group 24 keeps voltage fluctuation of the battery 101 at the lowest possible level when large current is consumed. Consequently, the camera body 10 operates with stability, while the final voltage of the battery 101 is detected accurately. This makes it possible to use up the energy of the battery 101 sufficiently. In the case where a battery and a capacitor are used as a power supply, it can be understood from the graph shown in FIG. 10 that the lifetime of the battery can be assertively increased in comparison with the case where only the battery is used as a power supply.

Figure 11:
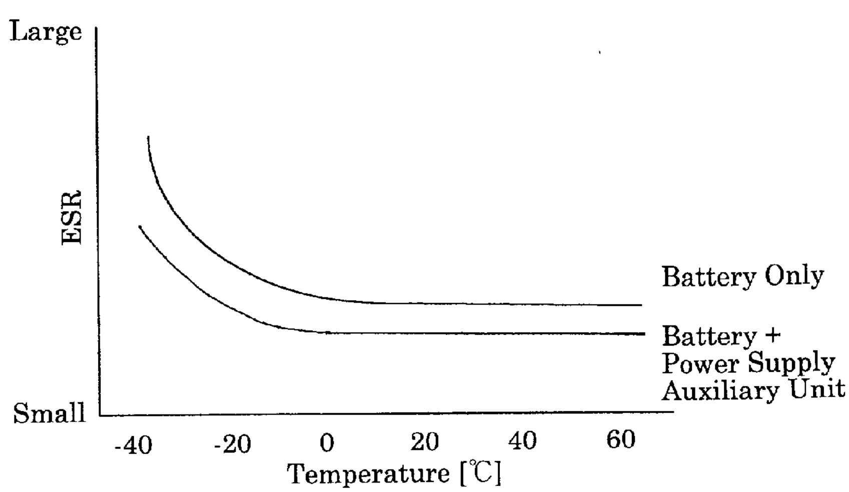
FIG. 11 is a graph showing a temperature characteristic of ESR (equivalent series resistance) when only a typical battery is used, and another temperature characteristic of ESR when both a typical battery and the auxiliary power supply unit are used.

FIG. 11 shows an ESR temperature characteristic (equivalent series resistance) when only a typical battery is used, and another ESR temperature characteristic when both the typical battery and the auxiliary power supply unit are used. If the temperature drops below zero centigrade, ESR increases rapidly, which makes it difficult to derive power from battery. Therefore, if only the battery 101 is used as a power supply, the battery 101 cannot supply a sufficient electric power to the camera body 10 at a low temperature. Namely, the camera body 10 cannot operate properly with only the battery 101 at a low temperature.

However, if a combination of the battery 101 and the capacitor group 24 which are connected in parallel is used as a power supply as shown in FIG. 9, the ESR of the power supply (i.e., a combination of the battery 101 and the capacitor group 24) can appear to be reduced since the ESR of the capacitor group 24 ("ESRc" shown in FIG. 9) is much smaller than the ESR of the battery 101 ("ESRb" shown in FIG. 9). Therefore, if the battery 101 and the capacitor group 24 which are connected in parallel are used as a power supply as shown in FIG. 9, the ESR of the battery 101 can be prevented from increasing, which makes it possible to supply large current to the camera body 10 at a low temperature.

Figure 12:
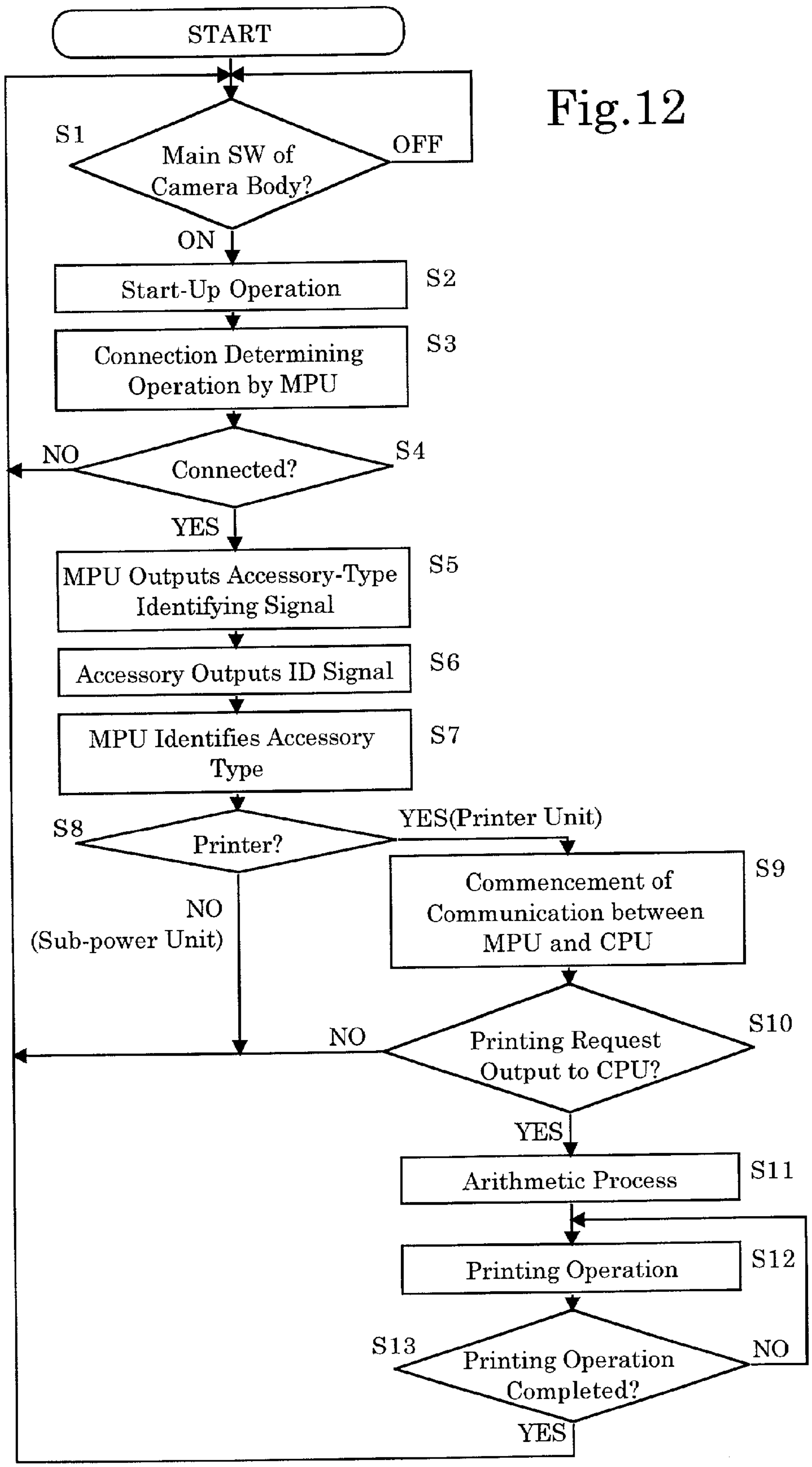
FIG. 12 is a flow chart showing fundamental operations of the digital camera system shown in FIG. 1.

Operations of the present embodiment of the digital camera system will be hereinafter discussed in detail with reference to the flow chart shown in FIG. 12.

Upon the power of the camera body 12 being turned ON (YES at step S1), the MPU 100 starts operating, so that a start-up operation of the camera body 10 is performed (step S2). During this start-up operation, the MPU 100 performs a communication operation via the control terminal array 11*a* to determine if an accessory is mounted to the camera body 10 via the I/F socket 11 (step S3). If it is determined that no accessory is mounted to the camera body 10 (NO at step S4), control returns to step S1. On the other hand, if it is determined that an accessory is mounted to the camera body 10 (YES at step S4), the MPU 100 outputs the aforementioned accessory-type identifying signal to the mounted accessory, e.g., the auxiliary power supply unit 20 or the printer unit 30 (step S5). Upon receipt of the accessory-type identifying signal, the mounted accessory outputs the ID signal thereof to the MPU 100 (step S6). Subsequently, the MPU 100 identifies the type of the mounted accessory in accordance with the received ID signal (step S7).

If the printer unit 30 is mounted to the camera body 30 (if YES at step S8), communications are carried out between the MPU 100 of the camera body 10 and the CPU 34 of the printer unit 30 (step S9). Subsequently, upon inputting a printing request from the MPU 100 of the camera body 10 (YES at step S10), the CPU 34 performs an arithmetic process (step S11), and the printer 36 operates to perform a printing operation thereof (step S12). Subsequently, upon completion of the printing operation (YES at step S13), control returns to step S1 to again perform the above described operations at and after step S1.

In the present embodiment of the digital camera system, if the auxiliary power supply unit 20 is mounted to the camera body 10, voltage fluctuation of the battery 101 is kept low since the capacitor group 24 is connected in parallel to the battery 101 of the camera body 10. Consequently, the camera body 10 operates with stability, while an error in the detection of the final voltage of the battery 101 is prevented from occurring. If there is little possibility of an error in the detection of the final voltage of the battery 101 occurring, the energy of the battery 101 can be used up sufficiently. This improves the consumption efficiency of the battery 101, and also prevents the internal resistance of the battery 101 from increasing, to thereby make it possible to supply large current to the camera body 10 at a low temperature.

In the present embodiment of the digital camera system, since an accessory which can be freely mounted to the camera body 10 is provided with a function to reduce the internal resistance of the battery 101 provided in the camera body 10, the precision in detection of the final voltage of the battery 101 can be improved when needed by simply mounting the auxiliary power supply unit 20 to the camera body 10 without increasing size, weight and cost of production of the camera body 10.

In the present embodiment of the digital camera system, although the battery 101 supplies power to charge the capacitor group 24 when the capacitor group 24 is connected in parallel to the battery 101, it is possible that the battery 101 be made so as to be electrically connected in parallel to the capacitor group 24 only when the power of the camera body 10 is ON. The number of capacitors which constitute the capacitor group 24 is preferably changed as appropriate in accordance with the type of portable electronic device to which the auxiliary power supply unit 20 is to be mounted and/or the type of battery to be used by the portable electronic device.

In the present embodiment of the digital camera system, since the I/F plug 21 of the auxiliary power supply unit 20 is made under the same standard as that of the I/F plug (e.g., the I/F plug 31) of a conventional accessory (e.g., the printer unit 30), it is not necessary for the camera body 10 to be provided with an additional connector (e.g., a socket or a plug) designed specifically for the auxiliary power supply unit 20, which reduces the cost of production. Even when an accessory such as the printer unit 30 is not used, the accessory can serve as a protection cover for covering the I/F socket 11 if mounted to the camera body 10. The auxiliary power supply unit 20 also serves as a protection cover for covering the I/F socket 11.

In the present embodiment of the digital camera system, since each of the auxiliary power supply unit 20 and the printer unit 30 is shaped so as to fit the shape of the camera body 10, the printer unit 30 mounted to the camera body 10 does not feel unusual to the user nor hinders the operability of the digital camera system.

In the present embodiment of the digital camera system, although the auxiliary power supply unit 20 and the printer unit 30 are provided as accessories for the camera body 10, any other device such as a GPS unit can be provided as an accessory for the camera body 10. In addition, the printer unit 30 or the above-mentioned GPS unit, etc., can be provided therein with one or more large-capacity electric double layer capacitors so that a function similar to that of the auxiliary power supply unit 20 can be provided to the printer unit or the GPS unit.

In the above descriptions, although a digital camera system has been discussed as a portable electronic system to which the present invention is applied, the present invention can be applied to any other portable electronic system. It is preferable that the prevent invention be applied to portable electronic systems in which load changes drastically (i.e., a heavy current variation occurs between standby and operating conditions), to make the most of the effectiveness of the prevent invention.

As can be understood from the above description, an auxiliary power supply unit and a portable electronic system which can restrain power supply voltage fluctuation of a portable electronic device and which can improve the consuming efficiency of the battery can be achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An auxiliary power supply unit which is mountable to a portable electronic device having a battery, comprising:

at least one capacitor; and an I/F connector which is connectable to an I/F connector of said portable electronic device, said I/F connector comprising power terminals connected to said battery;

wherein said I/F connector of the auxiliary power supply unit includes power terminals connected to said at least one capacitor;

wherein said at least one capacitor is connected in parallel to said battery when said auxiliary power supply unit is mounted to said portable electronic device via said power terminals of said I/F connectors; and wherein, when said at least one capacitor is connected to said battery in parallel, said at least one capacitor discharges to supply power to said portable electronic device when said portable electronic device is in operation, while said battery supplies power to said at least one capacitor to charge said at least one capacitor.

2. The auxiliary power supply unit according to claim 1, wherein said at least one capacitor is connected in parallel to said battery so as to reduce an internal resistance of said battery when said auxiliary power supply unit is mounted to said portable electronic device via said power terminals of said I/F connectors.

3. The auxiliary power supply unit according to claim 1, wherein said at least one capacitor comprises at least one large-capacity capacitor.

4. The auxiliary power supply unit according to claim 1, wherein said portable electronic device is a digital camera.

5. The auxiliary power supply unit according to claim 1, wherein the auxiliary power supply unit is attached to the portable electronic device at a position so as not to hinder operability of the portable electronic device.

6. The auxiliary power supply unit according to claim 1, wherein the auxiliary power supply unit is attached to a bottom surface of the portable electronic device.

7. A portable electronic system, comprising:

a portable electronic device including a battery and a first I/F connector having terminals connected to a battery; and at least one accessory which is mountable to said portable electronic device and includes a second I/F connector, said at least one accessory being mounted to said portable electronic device via said first and second I/F connectors;

wherein one of said at least one accessory includes an auxiliary power supply unit having at least one capacitor, said second I/F connector including terminals connected to said at least one capacitor;

wherein said at least one capacitor is connected in parallel to said battery when said auxiliary power supply unit is mounted to said portable electronic device via said first I/F connector and said second I/F connector; and wherein, when said at least one capacitor is connected to said battery in parallel, said at least one capacitor discharges to supply power to said portable electronic device when said portable electronic device is in operation, while said battery supplies power to said at least one capacitor to charge said at least one capacitor.

8. The portable electronic system according to claim 7, wherein said at least one capacitor is connected in parallel to said battery so as to reduce an internal resistance of said battery when said auxiliary power supply unit is mounted to said portable electronic device via said first and second I/F connectors.

9. The portable electronic system according to claim 7, wherein said second I/F connector of said one at least one accessory and a second I/F connector of another said at least one accessory are constructed substantially the same so as to both correspond to said first I/F connector.

10. The portable electronic system according to claim 9, wherein said first I/F connector comprises control terminals used for communication between said portable electronic device and said at least one accessory.

11. The portable electronic system according to claim 7, wherein said portable electronic device is a digital camera.

12. A digital camera system, comprising:

a camera body comprising a battery and a first I/F connector having power terminals connected to said battery; and at least one accessory which is mountable to said camera body and includes a second I/F connector, said at least one accessory being mounted to said camera body via said first and second I/F connectors;

wherein one of said at least one accessory includes an auxiliary power supply unit having at least one capacitor, said second I/F connector including power terminals connected to said at least one capacitor;

wherein said at least one capacitor is connected in parallel to said battery when said auxiliary power supply unit is mounted to said digital camera via said first and second I/F connectors; and wherein, when said at least one capacitor is connected to said battery in parallel, said at least one capacitor discharges to supply power to said portable electronic device when said portable electronic device is in operation, while said battery supplies power to said at least one capacitor to charge said at least one capacitor.

13. The digital camera according to claim 10, wherein one of said at least one accessory comprises a printer unit.

14. The portable electronic system of claim 7, wherein said at least one capacitor comprises at least one large-capacity capacitor.

15. The digital camera system of claim 12, wherein said at least one capacitor comprises at least one large-capacity capacitor.

* * * * *